(12) United States Patent
Szeteli et al.

(10) Patent No.: US 12,420,974 B2
(45) Date of Patent: Sep. 23, 2025

(54) RETRIEVAL SYSTEM AND METHOD FOR OPERATING A RETRIEVAL SYSTEM

(71) Applicant: AS Strömungstechnik GmbH, Ostfildern (DE)

(72) Inventors: Andreas Szeteli, Filderstadt (DE); Nico Fischer, Stuttgart (DE)

(73) Assignee: AS Strömungstechnik GmbH, Ostfildern (DE)

( * ) Notice: Subject to any disclaimer, the term of this patent is extended or adjusted under 35 U.S.C. 154(b) by 139 days.

(21) Appl. No.: 18/212,731

(22) Filed: Jun. 22, 2023

(65) Prior Publication Data

US 2023/0415945 A1 Dec. 28, 2023

(30) Foreign Application Priority Data

Jun. 22, 2022 (DE) .......................... 102022115563.3

(51) Int. Cl.
*B65B 69/00* (2006.01)
*B65B 3/26* (2006.01)

(52) U.S. Cl.
CPC ................ *B65B 69/00* (2013.01); *B65B 3/26* (2013.01)

(58) Field of Classification Search
CPC .................. B67D 7/0288; B67D 7/348; B67D 2007/0403; B67D 2007/0469; B67D 2007/0453; B25J 19/027; B25J 11/00; B65B 69/00; B65B 3/26
See application file for complete search history.

(56) References Cited

U.S. PATENT DOCUMENTS

2002/0189667 A1* 12/2002 O'Dougherty ......... B67D 7/348
137/1

FOREIGN PATENT DOCUMENTS

DE 102013109799 A1 3/2015
EP 0977702 B1 10/2001

* cited by examiner

*Primary Examiner* — Thomas M Wittenschlaeger
(74) *Attorney, Agent, or Firm* — Michael Soderman (57) ABSTRACT

A removal system (1) with at least one container (2) with a container opening (6), to which a removal head (4) can be attached, such that by means of the removal head (4), liquid (3) can be removed from the container (2) or liquid (3) can be supplied to the container (2). An RFID chip (9) is present on the container (2). A measurement head (14) with a coil (15) of an RFID reader unit can be attached to a movable robot arm (11). A code can be read from the RFID chip (9) with the RFID reader unit when it is within the reading range of the RFID reader unit, wherein when the code is read, it is adopted as positioning signal in a control unit (12) of the robot (10), on the basis of which the removal head (4) can be positioned on the container opening (6).

16 Claims, 5 Drawing Sheets

RETRIEVAL SYSTEM AND METHOD FOR OPERATING A RETRIEVAL SYSTEM

CROSS REFERENCE TO RELATED APPLICATIONS

This application claims the priority of DE 102022115563.3 filed on 2022 Jun. 22; this application is incorporated by reference herein in its entirety.

BACKGROUND

The invention relates to a removal system and a method for operating a removal system.

Such a removal system is used for filling and draining containers, particularly barrels, filled with liquid chemicals. The removal system comprises a removal head, which can be fastened to an immersion pipe of a container. By means of the removal head, via the immersion pipe, liquid can be removed from the container or supplied to the container.

Once a filling or removal procedure is completed, the removal head is detached from the immersion pipe and this is closed with an immersion pipe closure, such that the container can then be transported without liquid escaping from the container.

In known removal systems, the removal head is typically attached and released manually by a user. It is disadvantageous in this regard that a considerable personnel outlay is required, particularly when large facilities are involved, at which a large number of containers to which removal heads must be connected is present. Additionally, there is the risk that the user or users may come into contact with possibly hazardous chemicals.

In principle, it is possible for removal heads to be attached to containers in an automated manner by means of robots. Image processing systems are typically used to localize the immersion pipe, or a container opening in which the immersion pipe is placed in the container. The container can be detected optically with such image processing systems, wherein the container opening can be localized based on the container opening visible in images taken, and a robot carrying a removal head can maneuver to the container opening.

The use of image processing systems is time-consuming and cost-intensive. In particular, significant computing power must be made available for image evaluation. Finally, image processing systems are susceptible to disruptive influences, such as extraneous radiation, contamination, and the like.

SUMMARY

The invention relates to a removal system (1) with at least one container (2) with a container opening (6), to which a removal head (4) can be attached, such that by means of the removal head (4), liquid (3) can be removed from the container (2) or liquid (3) can be supplied to the container (2). The removal head (4) can be mounted automatically on the container opening (6) by means of a robot (10). An RFID chip (9) is present on the container (2) in the region of the container opening (6). A measurement head (14) can be attached to a movable robot arm (11), in which measurement head (14) a coil (15) of an RFID reader unit is present. A code can be read from the RFID chip (9) with the RFID reader unit when it is within the reading range of the RFID reader unit, wherein when the code is read, it is adopted as positioning signal in a control unit (12) of the robot (10), on the basis of which the removal head (4) can be positioned on the container opening (6).

DETAILED DESCRIPTION

The invention seeks to solve the problem of ensuring efficient, functionally-reliable operation of a removal system.

The features of the independent claims are provided to solve this problem. Advantageous embodiments and useful further developments are described in the dependent claims.

The invention relates to a removal system with at least one container with a container opening, to which a removal head can be attached, such that by means of the removal head, liquid can be removed from the container or liquid can be supplied to the container. The removal head can be mounted automatically on the container opening by means of a robot. An RFID chip is present on the container in the region of the container opening. A measurement head is attached to a movable robot arm and a coil of an RFID reader unit is present in the measurement head. A code can be read from the RFID chip with the RFID reader unit when it is in the reading range of the RFID reader unit, wherein when reading the code, this is adopted as positioning signal in a control unit of the robot. On the basis thereof, the removal head can be positioned on the container opening.

The invention further relates to a method for operating a removal system.

Therefore, fully automated operation of the removal system is ensured according to the invention. Removal heads on container openings are attached or released by means of a robot, without human involvement. This system can also be used in facilities with multiple containers to which different removal heads are attached.

Not only can a removal head be automatically fastened to a container opening of a container and then released with the robot. With robots, when a removal head is released from the container opening, a closure can also be fastened to the container opening and released again, as needed. Once the container opening has been closed with the closure, the container can be transported without liquid escaping from it.

Advantageously, an immersion pipe is placed in the container opening. Then, an opening of the immersion pipe can be closed with an immersion pipe closure. Once the immersion pipe closure is removed from the opening, a removal head can be fastened there. These processes also take place automatically with the robot.

According to the invention, an RFID chip is mounted fixed in place in the edge region of the container enclosing the container opening or in the region of the immersion pipe, which opens out at the container opening. At least one code is stored in the RFID chip in a known manner. Correspondingly thereto, the measurement head, also like every removal head that can be attached to the robot arm of the robot, has a coil as a sensor element of an RFID reader unit. The electronic components of the RFID reader unit are integrated in the robot itself. If the measurement head or a removal head is attached to the robot arms, the coil present there supplements itself with the electronic components [of] a robot into a complete RFID reader unit.

In principle, it is also possible to integrate a complete RFID reader unit within the measurement head.

When the measurement head is closely positioned, i.e., at a short distance from the container opening, the RFID chip of the container is within the reading range of the RFID reader unit, such that the code is read from the RFID chip by means of the RFID reader unit. According to the invention, when the code is read, it is adopted as a positioning signal, by which the position of the container opening on which a removal head is to be placed is known within the robot.

The fact that the current position of the measurement head in the robot is known, is exploited here. Once the code of the RFID chip is read, the current position of the measurement head is adopted in the control unit as a positioning signal that defines the position of the container opening.

In the known manner, the spatial position of the robot arm is detected by means of a sensor apparatus of the robot and fed to the control unit.

The measurement head is removed from the robot arm after determination of the positioning signal. A removal head is then attached to the robot arm, wherein the removal head can be positioned on the container opening based on the positioning signal.

An essential advantage of the invention consists in that the RFID system, with the RFID chip on the container and the RFID reader unit on the measurement head, forms a very simple and cost-effective sensor apparatus with which a measurement head is positioned on the container opening with positional exactitude. In particular, the RFID system is significantly more cost-effective than an image processing system. It is additionally advantageous that the RFID system is insensitive to external interference effects.

Especially advantageously, the container can be identified by means of the RFID chip.

For this purpose, data are encoded in the code of the RFID chip that identify the container and/or the liquid stored in the container.

An especially efficient embodiment of the removal system is obtained thereby, since the RFID system fulfills a double function, namely container identification, on the one hand, and the positioning of the measurement head on the container opening, on the other. With the RFID system forming an identification system, the sensor apparatus for positioning the measurement head is thus simultaneously provided, such that no additional sensor apparatus is required in this regard.

This identification is done with a removal head attached to the robot arm. Based on the container identification, an automatic check is also carried out as to whether the removal head is even permitted to be attached to the immersion pipe of the specific container.

According to a well-designed and useful embodiment, the container opening is present in a cover of a container.

The container usually has a hollow-cylindrical shape or the shape of a barrel, wherein the cover extends in a horizontal plane when the container is set on a horizontal substrate. In general, the container can be cuboid, or similar.

The immersion pipe placed in the container opening opens out with its opening on the cover of the container. The RFID chip can be placed there, in the edge region of the immersion pipe.

According to an advantageous embodiment, at least one tactile sensor is assigned to the measurement head, by means of which sensor contours of the container can be detected.

In particular, the tactile sensor is a force sensor.

The tactile sensor can be part of the measurement head. Advantageously, the tactile sensor is integrated in the robot, with which deflections or forces acting on segments of the measurement head can be detected.

To be able to attach a removal head to the container opening of the container, the position of the container opening on the container must be determined first, i.e., specifically the position of the container opening in the cover of the container. The same applies accordingly to attaching or removing the immersion pipe closure at the opening of the container.

For this purpose, it is advantageous for the position of the container opening to be determined by means of a rough positioning and then a subsequent fine positioning.

The rough positioning and fine positioning is performed with the measurement head mounted on the robot arm.

During the rough positioning, first, the contour of the container is scanned by means of the tactile sensor of the measurement head.

In this context, the cover of the container is searched for.

In this context, it is useful to scan the region of a cover of the container in which the container opening is arranged by means of the tactile sensor.

For this purpose, it is advantageous first to scan the height of the container, and then subsequently, an edge of the container projecting above the cover, with the tactile sensor.

In this context, the measurement head is guided over the cover in a search run until the RFID chip at the container opening is within the reading range of the RFID reader unit.

In this context, the tactile sensor comes into contact again and again with the edge of the container. When this occurs, the measurement head is again guided in the direction of the center of the container, wherein the movement direction of the measurement head is varied continuously so to detect the entire region of the cover.

This search run is continued until the RFID chip is within the reading range of the RFID reader unit. To perform the fine positioning, the RFID reader unit then reads the code from the RFID chip and adopts the current position of the measurement head as positioning signal that defines the position of the container opening.

After the fine positioning has been completed, a removal head is picked up from a storage by means of the robot and fastened on the robot arm in place of the measurement head. Using the positioning signal, the removal head is then positioned on the container opening and fastened there.

After filling or draining the container, the removal head is released by means of the robot the removal head from the container opening and detached from it. Then, instead of the removal head, a tool with a closure is attached to the robot arm and then positioned on the container opening, after which the closure is fastened on the container opening automatically by means of the robot.

The method according to the invention can be modified such that no specialized measurement head is used for generating the position signal. Rather, a removal head or a tool can be used as a measurement head, since these units also have coils for reading the RFID code.

In this case, it is merely necessary to provide a tactile sensor on the respective removal head or tool.

BRIEF DESCRIPTION OF THE DRAWINGS

The invention is explained in the following with reference to the drawings. They show.

DETAILED DESCRIPTION OF THE PREFERRED EMBODIMENTS

Figure 1:
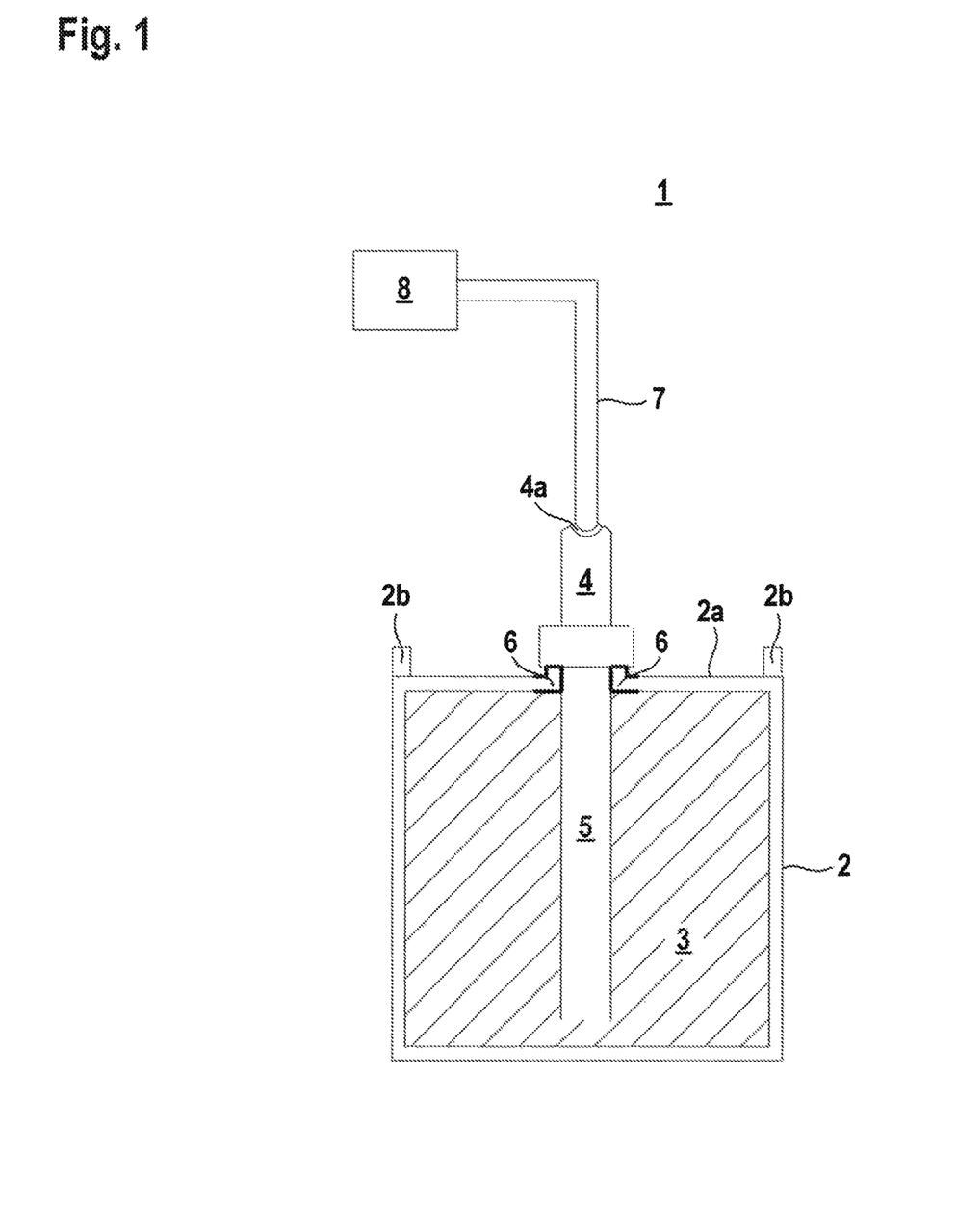
FIG. 1: Schematic depiction of the removal system according to the invention.

FIG. 1 shows schematically an exemplary embodiment of the removal system 1 according to the invention for transportable containers 2, which can be formed in particular by barrels or the like. A liquid 3 is stored in the respective container 2. The liquids 3 stored in such containers 2 are, in particular, special chemicals in liquid form.

The removal system 1 comprises a removal head 4, which can be fastened to an immersion pipe 5. The immersion pipe 5 is placed in a container opening 6 of the container 2. The longitudinal axis of the immersion pipe 5 runs in the vertical direction.

The removal head 4 is used for removing liquid 3 from the container 2. The removal head 4 can also be used for filling containers 2. For this purpose, the removal head 4 has a liquid connection 4a at its upper end. A line 7 that leads to a pump 8 is connected to this liquid connection 4a. The line 7 can be constituted in the form of a hose. The pump 8 is controlled by a control unit (not shown).

Figure 2:
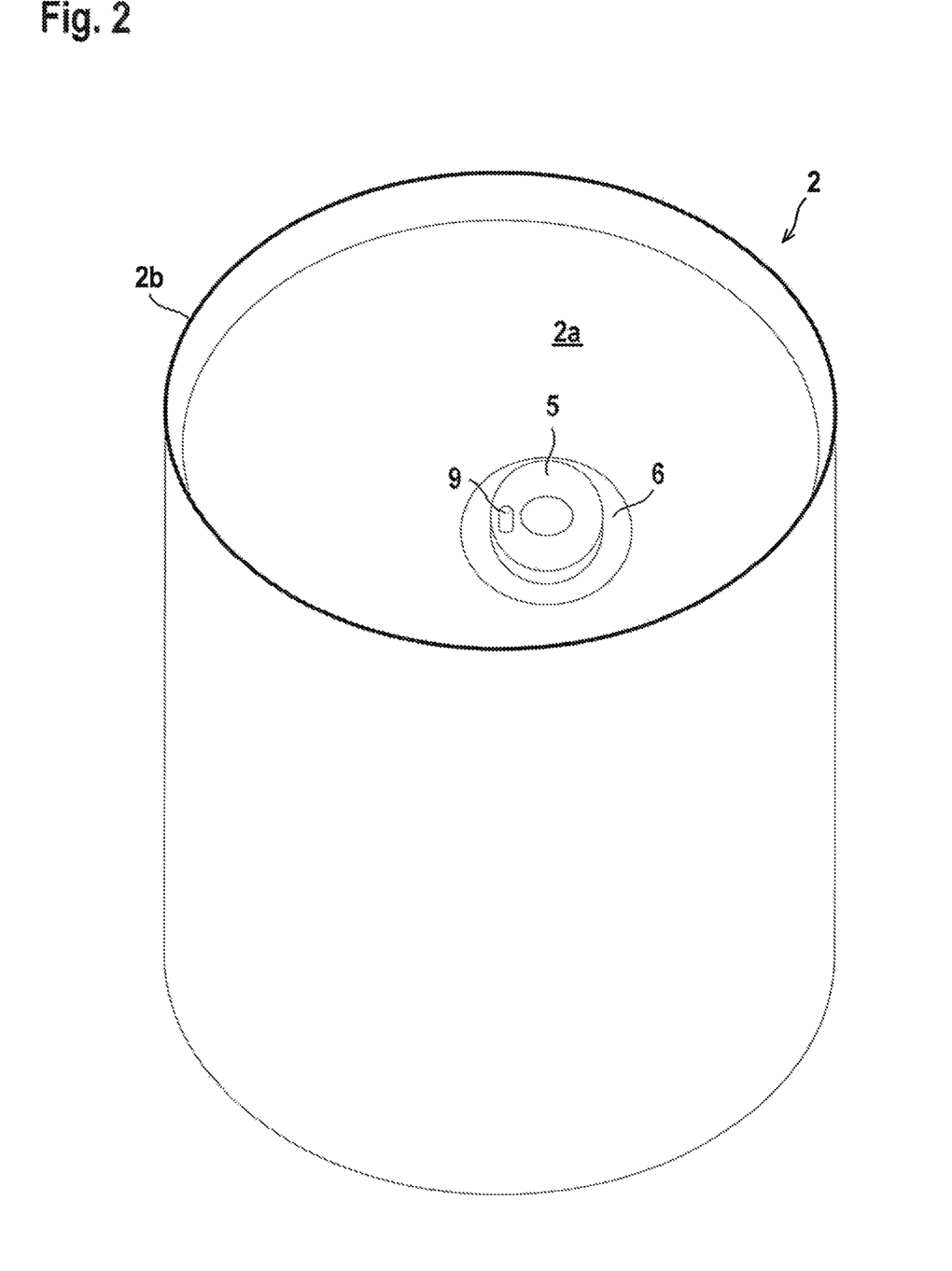
FIG. 2: Top-down view onto the top of a container for the removal system according to FIG. 1.

As is evident from FIGS. 1 and 2, the container 2 has on the top a cover 2a extending in a plane, from which cover 2a an edge 2b projects upwards.

The container opening 6 with the immersion pipe 5 inserted there is located in the cover 2a. In the region where the immersion pipe 5 opens out, there is an RFID chip 9 in which at least one code is stored. Data that uniquely identify the container 2 and/or the liquid 3 stored there are encoded in the code.

The removal system is operated in automated fashion by means of a robot 10 (FIGS. 6 to 9). The robot 10 has, in a known manner, a retractable and extendable robot arm 11 that is movable in three dimensions that can perform work movements. The robot arm 11 is controlled with a control unit 12. The current position of the robot arm 11 in the workspace is detected continuously by means of a sensor apparatus integrated in the robot 10.

Figure 3:
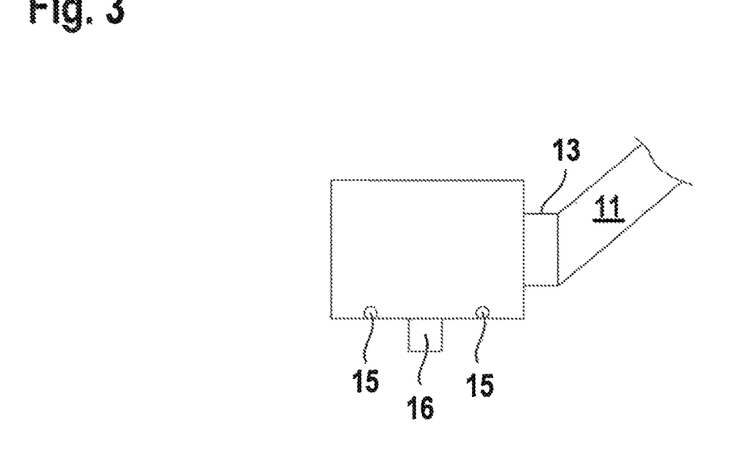
FIG. 3: Individual depiction of a measurement head with a connection to a robot arm of a robot.
Figure 4:
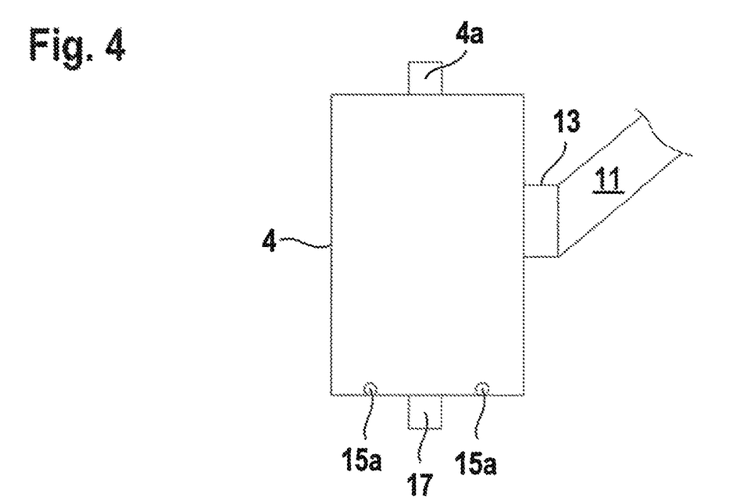
FIG. 4: Individual depiction of a removal head with a connection to a robot arm of a robot.
Figure 5:
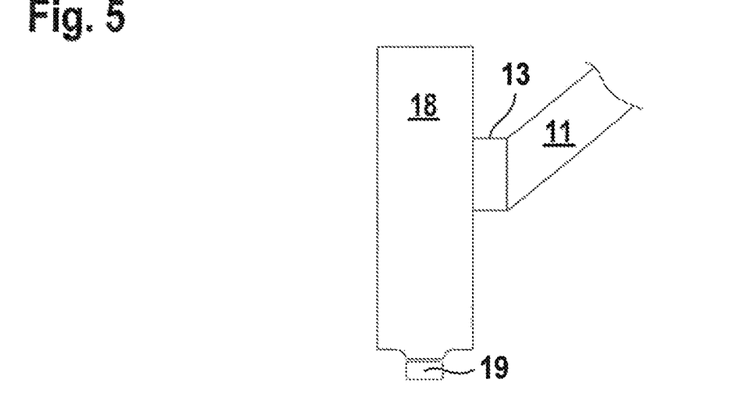
FIG. 5: Individual depiction of a tool accommodating a closure with a connection to a robot arm of a robot.

The robot arm 11 has a connection flange 13 onto which different components of the removal system 1 can be fastened and attached automatically (FIGS. 3 to 5).

As a first component, a measurement head 14 can be attached to the attachment flange 13 of the robot arm 11 (FIG. 3). A coil 15 that forms the sensor element of an RFID reader unit is integrated in the measurement head 14. The electronic components of the RFID reader unit are integrated in the robot 10.

The measurement head 14 additionally has a lug 16 opening out on its bottom, the lug 16 forming a tactile element that is connected to a tactile sensor (not shown), particularly a force sensor, in the robot 10. Forces acting on the measurement head 14 can be detected with the tactile sensor thus formed.

As a second component, a removal head 4 can be attached to the robot arm 11 (FIG. 4). The removal head 4 has an attachment piece 17 for connecting to the immersion pipe 5.

The removal head 4 further has a coil 15a, which forms an RFID reader unit with the electronic components in the robot 10.

A storage is advantageously provided in the region of the robot 10 in which different removal heads for different containers 2 are stored. Once the removal head 4 has been attached to the immersion pipe 5 by means of the robot 10, the RFID chip 9 of the immersion pipe 5 is located in the reading range of the RFID reader unit of the removal head 4, and at least one code is read from the RFID chip 9.

The container 2 and/or its contents are identified based on the code. In particular, this information allows for detection of whether the removal head 4 is suitable for supplying or removing liquid 3, or not.

As a third component, a tool 18 can be connected to the robot arm 11, wherein an immersion pipe closure 19 can be placed on the tool 18. An opening in the immersion pipe 5 can be closed with the immersion pipe closure 19 automatically if no removal head 4 is attached there. Similarly, the immersion pipe closure 19 can be released again from the immersion pipe 5 with the tool 18.

To be able to attach a removal head 4 to the immersion pipe 5 of the container 2, first the position of the container opening 6 with the immersion pipe 5 must be determined.

Figure 6:
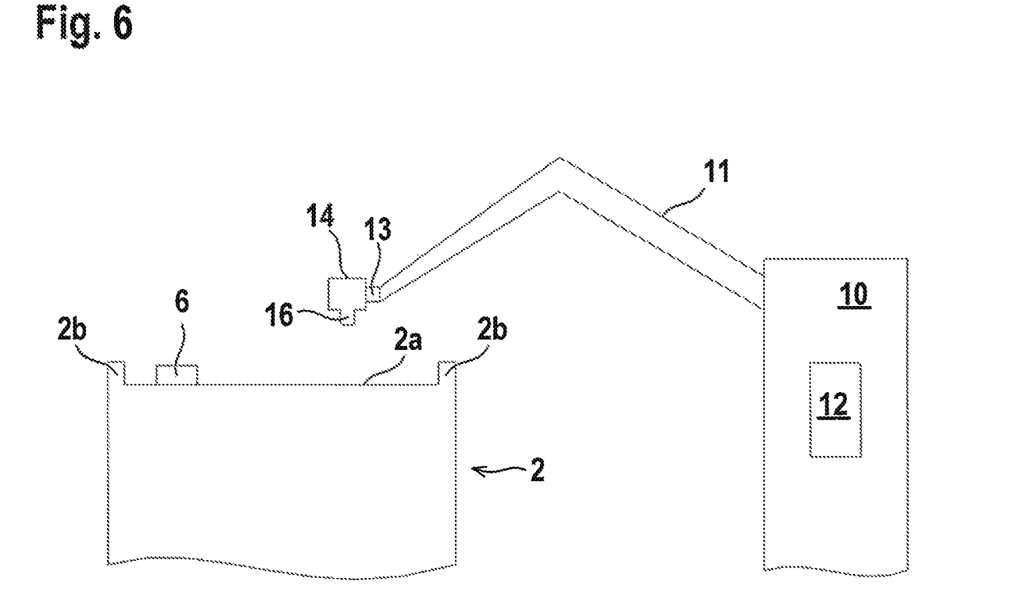
FIG. 6: First depiction of a positioning of a measurement head by means of a robot.
Figure 7:
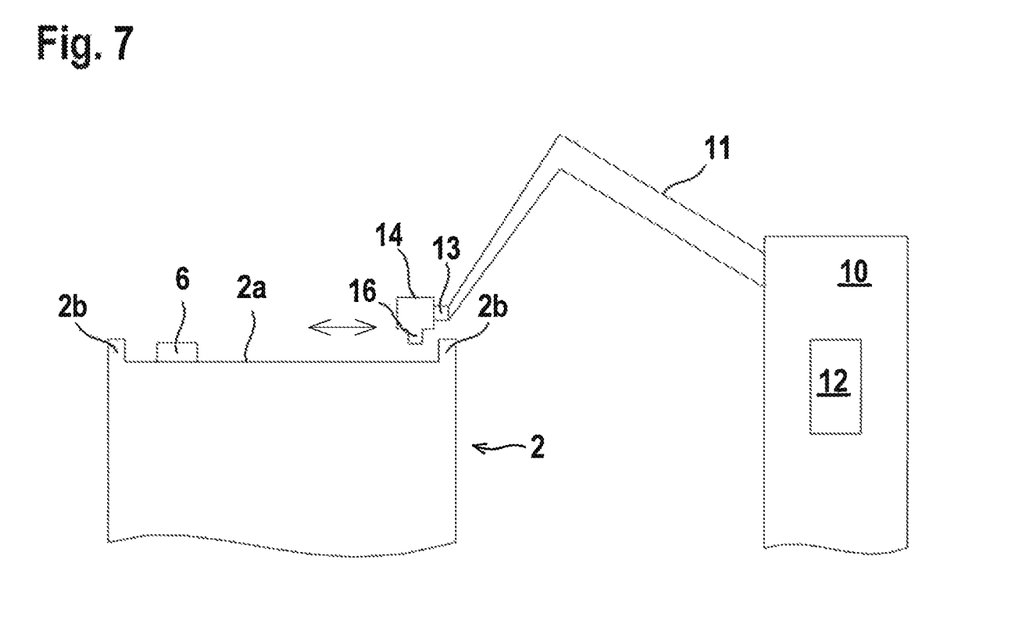
FIG. 7: Second depiction of a positioning of a measurement head by means of a robot.

For this purpose, the measurement head 14 is attached to the robot arm 11 (FIGS. 6 and 7). A rough positioning is first performed with the measurement head 14 based on signals of the tactile sensor, and then a fine positioning is performed by reading the code from the RFID chip 9 of the immersion pipe 5. First, the height of the container 2 is scanned with the measurement head 14 in that the measurement head 14 is guided by the robot arm against the cover 2a of the container 2, and the tactile sensor generates a signal through the contact with the cover 2a (FIG. 6). The measurement head 14 is then guided closely above the cover 2a until it is guided against the edge 2b of the container 2 and the tactile sensor again generates a signal (FIG. 7). The measurement head 14 is guided from the edge 2b of the container 2 in the direction of the center of the container 2 until it is once again guided against the edge 2b of the container 2, and the tactile sensor once again generates a signal. In this manner, the measurement head 14 is guided over the cover 2a of the container 2 until the measurement head 14 is guided against the container opening 6, after which the tactile sensor again emits a signal. Then the measurement head 14 approaches the container opening 6 until the RFID chip 9 is within the reading range of the coil 15. The RFID reader unit then reads the code from the RFID chip 9 and adopts this as a positioning signal such that the position of the measurement head 14 present upon reading the code is adopted as position of the container opening 6.

Figure 8:
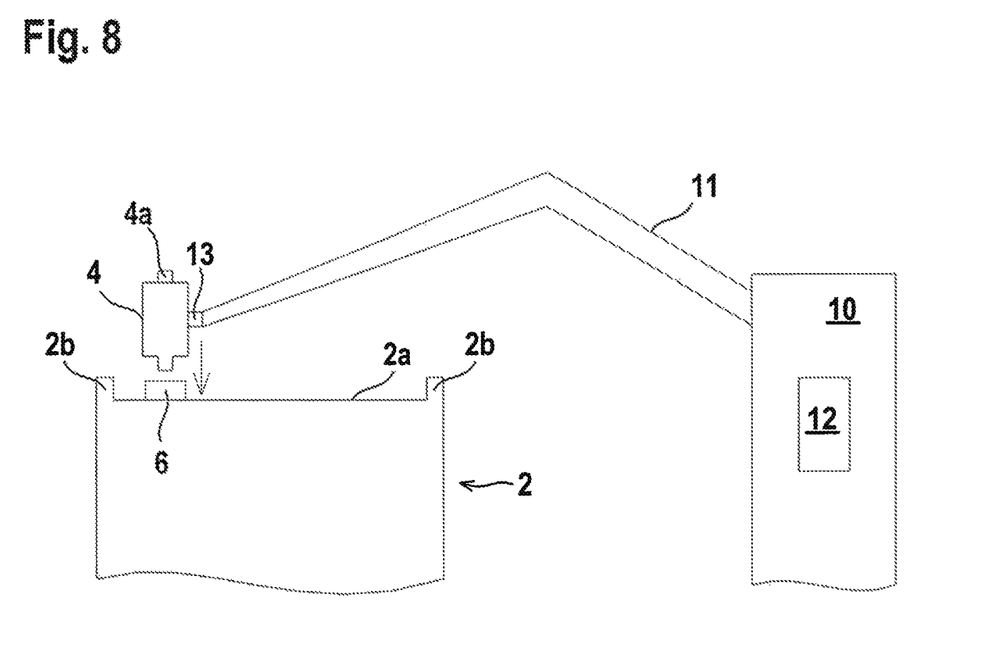
FIG. 8: Depiction of a positioning of a removal head by means of a robot.

After the position of the container opening 6 has been determined, the measurement head 14 is placed in a storage and then a removal head 4 is automatically attached to the robot arm 11, which is done automatically by the robot 10. Based on the known position of the container opening 6, the removal head 4 is then guided to this container opening 6 with the robot arm 11 (FIG. 8). The removal head 4 is then connected to the immersion pipe 5 by means of the robot 10.

Liquid 3 can now be removed from the container 2 or supplied to it.

After this procedure is complete, the removal head 4 is automatically released from the immersion pipe 5 by means of the robot 10, and the robot 10 places the removal head 4 in the storage.

Figure 9:
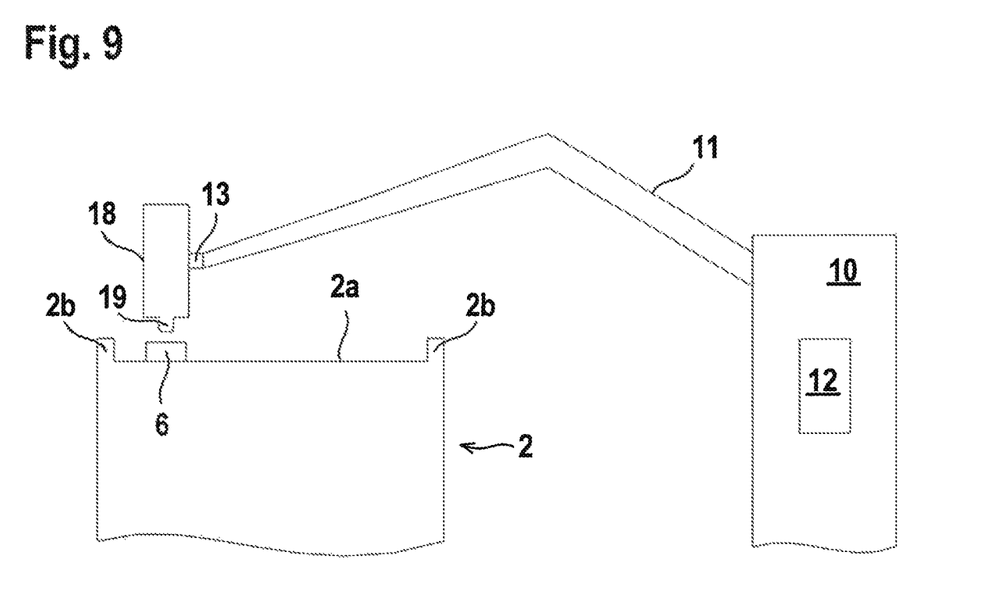
FIG. 9: Depiction of a positioning of a tool by means of a robot.

After that, the tool 18 with the immersion pipe closure 19 is automatically attached to the robot arm 11. The robot arm 11 guides the tool 18 to the container opening 6, then the tool 18 closes the opening of the immersion pipe 5 with the immersion pipe closure 19.

The container 2 can now be further transported.

LIST OF REFERENCE NUMERALS (1) removal system
(2) container
(2a) cover
(2b) edge
(3) liquid
(4) removal head
(5) immersion pipe
(6) container opening
(7) line
(8) pump
(9) RFID chip
(10) robot
(11) robot arm
(12) control unit
(13) attachment flange
(14) measurement head
(15) coil
(15a) coil
(16) lug
(17) attachment piece
(18) tool
(19) immersion pipe closure

The invention claimed is:

1. A removal system (1) comprising at least one container (2) with a container opening (6) and a removal head (4) that can be attached to the container opening, such that by means of the removal head (4), liquid (3) can be removed from the container (2) or liquid (3) can be supplied to the container (2), characterized in that the removal system further comprises a robot (10) with a robot arm (11) and a measurement head (14), wherein the removal head (4) can be mounted automatically on the container opening (6) by means of the robot (10), wherein an RFID chip (9) is present on the container (2) in the region of the container opening (6), and wherein the measurement head (14) can be attached to the movable robot arm (11), in which measurement head (14) a coil (15) of an RFID reader unit is present, wherein a code can be read from the RFID chip (9) with the RFID reader unit when the RFID chip (9) is within the reading range of the RFID reader unit, wherein when the code is read, it is adopted as positioning signal in a control unit (12) of the robot (10), on the basis of which the removal head (4) can be positioned on the container opening (6).

2. The removal system (1) according to claim 1, characterized in that the robot detects the current position of the measurement head (14).

3. The removal system (1) according to claim 1, characterized in that the spatial position of the robot arm (11) is detected by means of a sensor apparatus of the robot (10) and fed to the control unit (12).

4. The removal system (1) according to claim 1, characterized in that after determination of the positioning signal, the measurement head (14) is detached from the robot arm (11) and the removal head (4) is attached to the robot arm (11).

5. The removal system (1) according to claim 1, characterized in that an immersion pipe (5) is placed in the container opening (6), and the removal head (4) can be attached to the immersion pipe (5).

6. The removal system (1) according to claim 5, characterized in that the RFID chip (9) is arranged near an edge region of the immersion pipe (5), which is in the container opening (6).

7. The removal system (1) according to claim 1, characterized in that the container (2) can be identified by means of the RFID chip (9), wherein data are encoded in the code of the RFID chip (9) that identify the container (2) and/or the liquid (3) stored in the container (2).

8. The removal system (1) according to claim 1, characterized in that when the removal head (4) is detached, the container opening (6) can be closed with a closure, wherein the closure is automatically opened and closed by means of the robot (10), wherein a tool (18) with the closure can be attached to the robot arm (11) for opening or closing the container opening (6).

9. The removal system (1) according to claim 1, characterized in that at least one tactile sensor is assigned to the measurement head (14) by means of which sensor contours of the container (2) can be detected.

10. A method for operating a removal system (1) with at least one container (2) with a container opening (6), to which a removal head (4) can be attached, such that by means of the removal head (4), liquid (3) can be removed from the container (2) or liquid (3) can be supplied to the container, characterized in that the position of the container opening (6) is first determined by means of a rough positioning and then a subsequent fine positioning, wherein the rough positioning and fine positioning are performed with a measurement head (14) placed on a robot arm (11), wherein the removal head (4) is subsequently mounted automatically on the container opening (6) by means of a robot (10), wherein an RFID chip (9) is present on the container (2) in the region of the container opening (6), and wherein the measurement head (14) can be attached to the movable robot arm (11), in which measurement head (14) a coil (15) of an RFID reader unit is present, wherein a code can be read from the RFID chip (9) with the RFID reader unit when the RFID chip (9) is within the reading range of the RFID reader unit, wherein when the code is read, it is adopted as positioning signal in a control unit (12) of the robot (10), on the basis of which the removal head (4) can be positioned on the container opening (6).

11. The method according to claim 10, characterized in that the contour of the container (2) is scanned by means of a tactile sensor of the measurement head (14) during the rough positioning, wherein in particular the region of a cover (2a) of the container (2) in which the container opening (6) is arranged is scanned by means of the tactile sensor.

12. The method according to claim 11, characterized in that first, the height of the container (2), and then subsequently, an edge (2b) of the container (2) projecting above a cover, is scanned with the tactile sensor, and in that the measurement head (14) is guided over the cover in a search run until the RFID chip (9) at the container opening (6) is within the reading range of the RFID reader unit.

13. The method according to claim 12, characterized in that the fine positioning of the measurement head (14) on the container opening (6) is done by reading the code from the RFID chip (9) and adopting it as positioning signal.

14. The method according to claim 13, characterized in that after the fine positioning has been completed, the removal head (4) is picked up from a storage by means of the robot (10) and fastened on the robot arm (11) in place of the measurement head (14), and using the positioning signal, the removal head (4) is then positioned on the container opening (6) and fastened there.

15. The method according to claim 14, characterized in that after filling or draining the container (2), the removal head (4) is released, by means of the robot (10), from the container opening (6) and detached from it, and in that a tool (18) with a closure is attached to the robot arm (11) instead of the removal head (4), and then positioned on the container opening (6), after which the closure is fastened to the container opening (6).

16. The method according to claim 10, characterized in that a removal head or a tool (18) is used as measurement head (14).

\* \* \* \* \*